UNITED STATES PATENT OFFICE.

RICHARD TAGGESELL, OF BUFFALO, NEW YORK, ASSIGNOR TO SCHOELL-KOPF, HARTFORD & HANNA COMPANY, OF SAME PLACE.

BROWN DYE AND PROCESS OF MAKING SAME.

SPECIFICATION forming part of Letters Patent No. 683,190, dated September 24, 1901.

Application filed November 15, 1900. Serial No. 36,636. (Specimens.)

*To all whom it may concern:*

Be it known that I, RICHARD TAGGESELL, a subject of the King of Saxony, and a resident of Buffalo, in the county of Erie and State of New York, have invented a new and useful Improvement in Brown Dyestuffs, of which the following is a specification.

The object of this invention is to produce a dyestuff by which unmordanted cotton is dyed a dark-brown color or shade. The material from which this dyestuff is made is the meta-amidotolyloxaminsulfo-acid "A" or "B," described and claimed, respectively, in Letters Patent of the United States Nos. 659,496 and 659,497, granted to Schoellkopf, Hartford & Hanna Company, as assignee of myself, on the 9th day of October, 1900. By diazotizing either of these oxaminsulfo-acids and combining the resulting diazo compound with gamma-amidonaphtholsulfo-acid in an alkaline solution a product results which dyes wool in an acidulated bath a brownish-red shade, but which is of no particular value as a dyestuff. By heating this product with a saponifying agent it loses the rest of the oxalic acid and forms a product which contains two free amido groups. When this product is treated with nitrite of soda in an acid solution, a tetrazo compound is formed, which, combined with two molecules of a meta-diamin of the benzene series, forms a dark-brown dyestuff. This new dyestuff is represented by the following general formula:

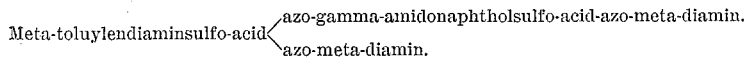

This dyestuff is a dark flaky powder, easily soluble in water, which it colors brown, and dyes unmordanted cotton a dark-brown shade. It is soluble in concentrated sulfuric acid, which it colors brown, and is precipitated therefrom in dark flakes upon adding water. This new dyestuff is capable of taking up two molecules of a diazotized amido compound, which latter enters the rest of the meta-diamin. By so combining the described new dyestuff with a diazotized amido compound the dyestuff is rendered somewhat stronger, faster against light, more readily soluble in water, and cheaper. This ultimate dyestuff, consisting of said new dyestuff combined with two molecules of a diazotized amido compound, is also a dark powder, easily soluble in water, which it colors brown, and dyes unmordanted cotton a dark-brown shade. It is represented by the following general formula:

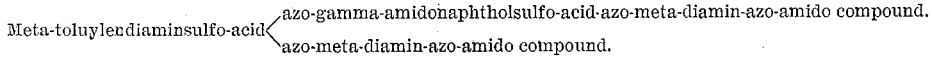

As an example I will describe the manufacture of my improved dyestuff from one molecule of said meta-amidotolyloxaminsulfo-acid "A," one molecule of gamma-amidonaphtholsulfo-acid, two molecules of meta-phenylendiamin, and two molecules of naphthionic acid. Two hundred and seventy-four parts, by weight, of said meta-amidotolyloxaminsulfoacid "A" are dissolved in water by means of one hundred and ten parts of soda carbonate. This solution is mixed with seventy parts of nitrite of soda and stirred in two hundred and fifty parts of muriatic acid of 22° Baumé, cooled by ice. The resulting diazo compound is poured in a solution of two hundred and seventy parts of gamma-amidonaphtholsulfo-acid and two hundred parts of soda carbonate. The resulting product is salted out, filtered, and pressed. The press-cake is heated for about one hour with a solution of soda-lye of about 10° Baumé, containing one hundred parts of caustic soda. This product is then neutralized by adding about three hundred parts of muriatic acid. Then five hundred parts of muriatic acid are added, and the tetrazo compound is formed by mixing with one hundred and forty parts of nitrite of soda. The tetrazo compound, which appears as a reddish-brown precipitate, is mixed with a solution of two hundred and sixteen parts of meta-phenylendiamin in about one thousand parts of water, and the mixture is neutralized by adding an alkali. The resulting dyestuff has the form of dark-brown crystallic flakes.

After stirring for about two hours the diazo naphthionic acid is stirred in and the mixture made alkaline by adding soda carbonate. This acid is obtained in the usual way from four hundred and ninety parts of naphthionate of soda, five hundred parts of muriatic acid of 22° Baumé, and one hundred and forty parts of nitrite of sodium. After stirring for about one day the resulting dyestuff is salted out, pressed, and dried. It is a dark or black powder, easily soluble in water, which it colors brown, and dyes unmordanted cotton a dark brown. If in the above treatment the said oxaminsulfo-acid "A" is replaced by said oxaminsulfo-acid "B," or the meta-phenylendiamin by meta-toluylendiamin, or the naphthionic acid by sulfanilic acid, metanilic acid, toluidinsulfo-acid, or B-naphthylaminsulfo-acid, a similar product is obtained.

I claim as my invention—

1. The herein-described method of producing a dyestuff which consists in diazotizing a meta-amidotolyloxaminsulfo-acid, combining the resulting diazo compound with gamma-amidonaphtholsulfo-acid in an alkaline solution, heating the resulting compound with a saponifying agent, tetrazotizing the product and combining this tetrazo compound with a meta-diamin of the benzene series, substantially as set forth.

2. The herein-described method of producing a dyestuff which consists in diazotizing a meta-amidotolyloxaminsulfo-acid, combining the resulting diazo compound with gamma-amidonaphtholsulfo-acid in an alkaline solution, heating the resulting compound with a saponifying agent, tetrazotizing the product, combining this tetrazo compound with a meta-diamin of the benzene series, and combining the resulting dyestuff with two molecules of a diazotized amidosulfo-acid, substantially as set forth.

3. The herein-described new dyestuff, derived from meta-amidotolyloxaminsulfo-acid, represented by the general formula:

$$\text{Meta-toluylendiaminsulfo-acid} \begin{cases} \text{azo-gamma-amidonaphtholsulfo-acid-azo-meta-diamin,} \\ \text{azo-meta-diamin,} \end{cases}$$

being a dark powder, easily soluble in water, which it colors brown, soluble in concentrated sulfuric acid, which it colors brown and from which it is precipitated in dark flakes upon adding water, and dyeing unmordanted cotton a dark brown, substantially as set forth.

Witness my hand this 10th day of November, 1900.

RICHARD TAGGESELL.

Witnesses:
JNO. J. BONNER,
C. B. HORNBECK.